US012718673B2

(12) United States Patent
Raman et al.

(10) Patent No.: US 12,718,673 B2
(45) Date of Patent: Aug. 25, 2026

(54) SYSTEM FOR AUTONOMOUSLY GENERATING A SECURITY SOLUTION FOR A PROPERTY

(71) Applicant: Sauron Industries Inc., San Francisco, CA (US)

(72) Inventors: Vasumathi Raman, San Francisco, CA (US); Yvonne Mclaughlin, Tiburon, CA (US); Peter Stephens, San Francisco, CA (US)

(73) Assignee: Sauron Industries Inc., San Francisco, CA (US)

( * ) Notice: Subject to any disclaimer, the term of this patent is extended or adjusted under 35 U.S.C. 154(b) by 0 days.

(21) Appl. No.: 19/360,802

(22) Filed: Oct. 16, 2025

(65) Prior Publication Data

US 2026/0105822 A1 Apr. 16, 2026

Related U.S. Application Data

(60) Provisional application No. 63/727,932, filed on Dec. 4, 2024, provisional application No. 63/708,045, filed on Oct. 16, 2024.

(51) Int. Cl.
*G08B 13/196* (2006.01)

(52) U.S. Cl.
CPC ... *G08B 13/19639* (2013.01); *G08B 13/1968* (2013.01)

(58) Field of Classification Search
CPC ...................... G08B 13/19639; G08B 13/1968
See application file for complete search history.

(56) References Cited

U.S. PATENT DOCUMENTS

| | | | | |
|---|---|---|---|---|
| 11,303,853 B2 * | 4/2022 | Kallakuri | ............. | G06N 3/0464 |
| 2013/0163976 A1 * | 6/2013 | Pierce | .................. | G08B 15/001 396/427 |
| 2025/0193347 A1 * | 6/2025 | Kallakuri | ............... | G06N 20/20 |

* cited by examiner

*Primary Examiner* — Jae N Noh

(74) *Attorney, Agent, or Firm* — Run 8 Patent Group, LLC; Peter Miller; Marissa Kohrman

(57) ABSTRACT

One variation of a method includes: accessing a representation of a property including extant features; accessing a surveillance zone and an installation preference defined by a user for installation of a security system on the property; generating a first sensor configuration for a set of sensors of the security system that fulfills the installation preference and captures the surveillance zone; calculating a first security score for the first sensor configuration based on a first field of view of the first sensor configuration; generating a second sensor configuration for the set of sensors that fulfills the installation preference and captures the surveillance zone; calculating a second security score for the second sensor configuration based on a second field of view of the second sensor configuration; and, in response to the second security score exceeding the first security score, serving the second sensor configuration to the user via a user portal.

19 Claims, 4 Drawing Sheets

S170

| | | | | USER PORTAL |
|---|---|---|---|---|
| USER PREFERENCE | IMPORTANCE | ZONE #1 | ZONE #2 | ZONE #3 |
| SENSOR VISIBILITY | | 9 | 6 | 3 |
| LANDSCAPE TRIMMING | | 5 | 8 | 9 |
| SENSORS ON GATE | | 7 | 5 | 4 |
| WEIGHTED SECURITY SCORE | | 7 | 6.3 | 5.3 |

SYSTEM FOR AUTONOMOUSLY GENERATING A SECURITY SOLUTION FOR A PROPERTY

CROSS-REFERENCE TO RELATED APPLICATIONS

This Application claims the benefit of U.S. Provisional Application No. 63/727,932, filed on 4 Dec. 2024, and U.S. Provisional Application No. 63/708,045, filed on 16 Oct. 2024, each of which is incorporated in its entirety by this reference.

TECHNICAL FIELD

This invention relates generally to the field of internet security and, more specifically, to a new and useful method for autonomously generating a security solution for a property in the field of internet security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
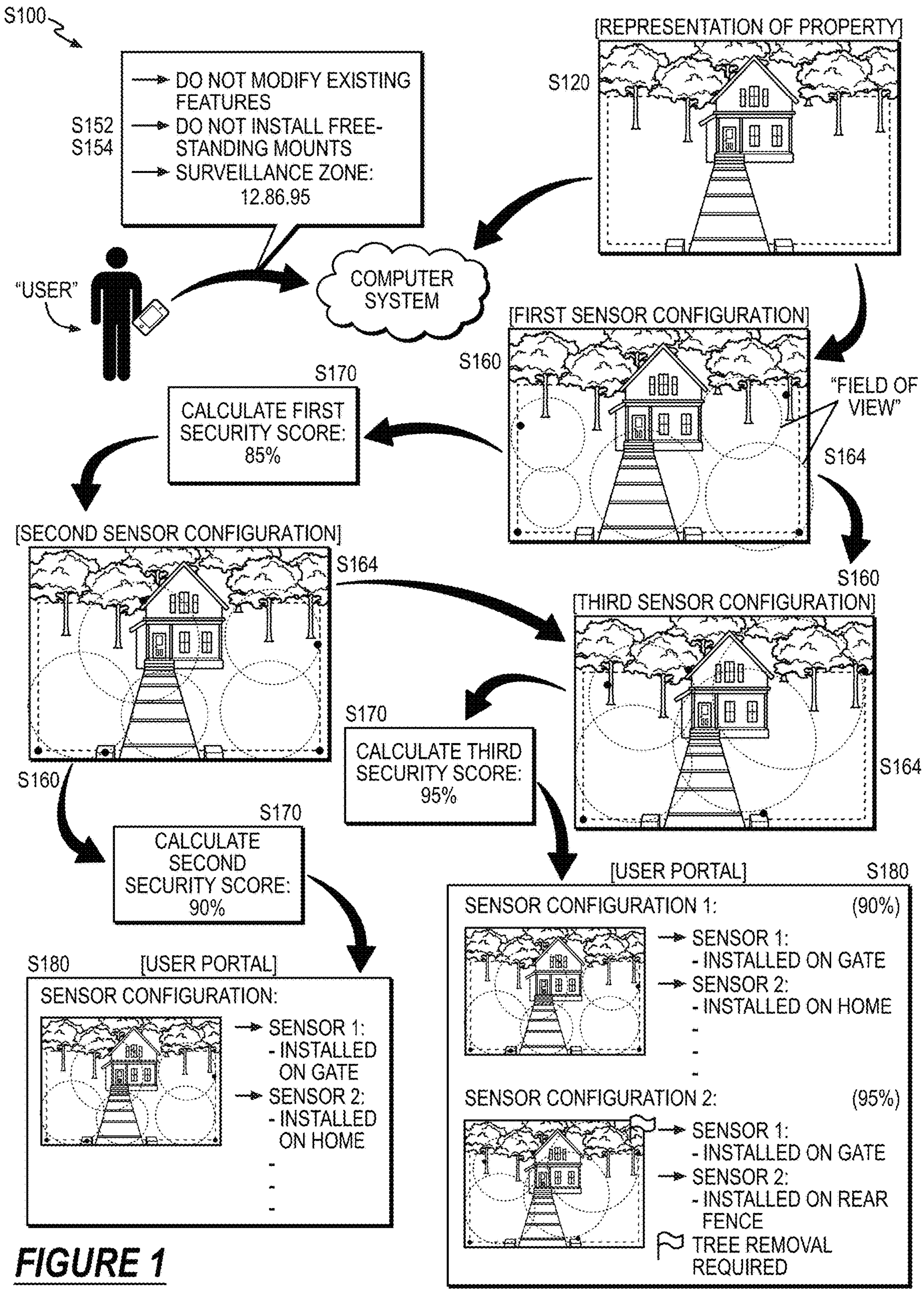
FIG. 1 is a flowchart representation of a method.
Figure 2:
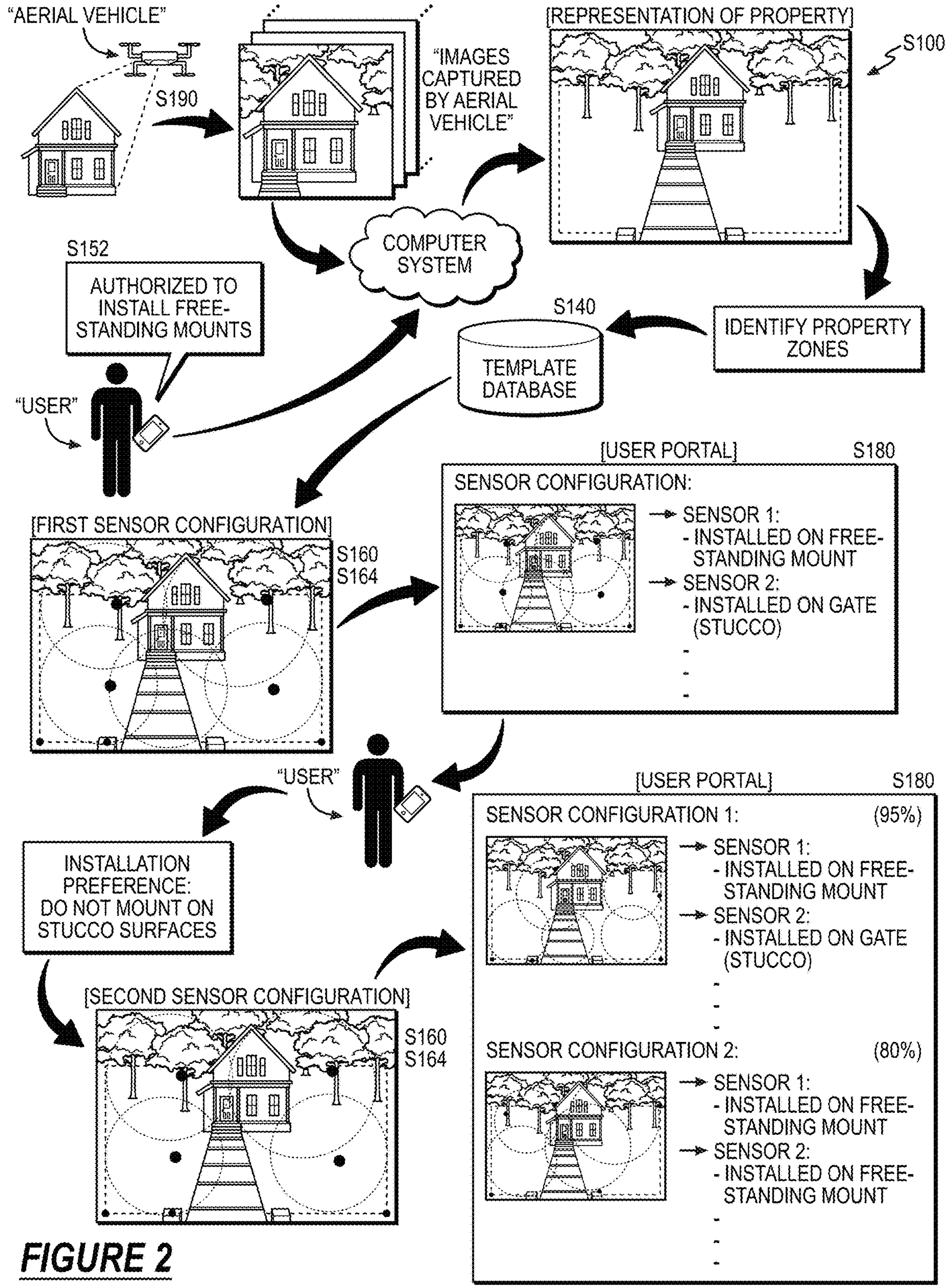
FIG. 2 is a flowchart representation of one variation of the method.

As shown in FIGS. 1-2, a method S100 includes: accessing a representation of a property, the representation depicting a building (e.g., a home) and exterior features (e.g., foliage, fencing) located on the property in Block S120; accessing an installation preference defined by a user (e.g., a property owner) for installation of a security system on the property in Block S152; and accessing a surveillance zone of the property defined by the user for surveillance by the security system in Block S154.

The method S100 also includes generating a first sensor configuration for a set of sensors of the security system in Block S160, the first sensor configuration: fulfilling the installation preference; encompassing the surveillance zone; and characterized by a first set of sensor positions. The method S100 further includes: simulating a first field of view of the first sensor configuration based on the representation of the property and properties of the set of sensors in Block S164; calculating a first security score for the first sensor configuration based on the first field of view of the first sensor configuration in Block S170; and perturbing the first set of sensor positions of the first sensor configuration to generate a second set of sensor positions.

The method S100 also includes generating a second sensor configuration for the set of sensors in Block S160, the second sensor configuration: fulfilling the installation preference; encompassing the surveillance zone; and characterized by the second set of sensor positions. The method S100 further includes: simulating a second field of view of the second sensor configuration based on the representation of the property and properties of the set of sensors in Block S164; calculating a second security score for the second sensor configuration based on the second field of view of the second sensor configuration in Block S170; and, in response to the second security score exceeding the first security score, serving the second sensor configuration to the user via a user portal in Block S180.

1.1. Variation: Multi-Configuration Presentation

As shown in FIGS. 1-2, one variation of the method S100 includes: accessing a representation of a property, the representation depicting extant features located on the property in Block S120; accessing an installation preference defined by a user for installation of a security system on the property in Block S152; generating a first sensor configuration for a set of sensors of the security system, the first sensor configuration fulfilling the installation preference based on the representation of the property in Block S160; and calculating a first security score for the first sensor configuration based on a first field of view of the first sensor configuration in Block S170.

This variation of the method S100 also includes: generating a second sensor configuration for the set of sensors, the second sensor configuration fulfilling the installation preference based on the representation of the property in Block S160; calculating a second security score for the second sensor configuration based on a second field of view of the second sensor configuration in Block S170; and, in response to the second security score exceeding the first security score, serving the second sensor configuration to the user via a user portal in Block S180.

1.2. Variation: Property Complexity Score+User Preference Survey

Figure 3A:
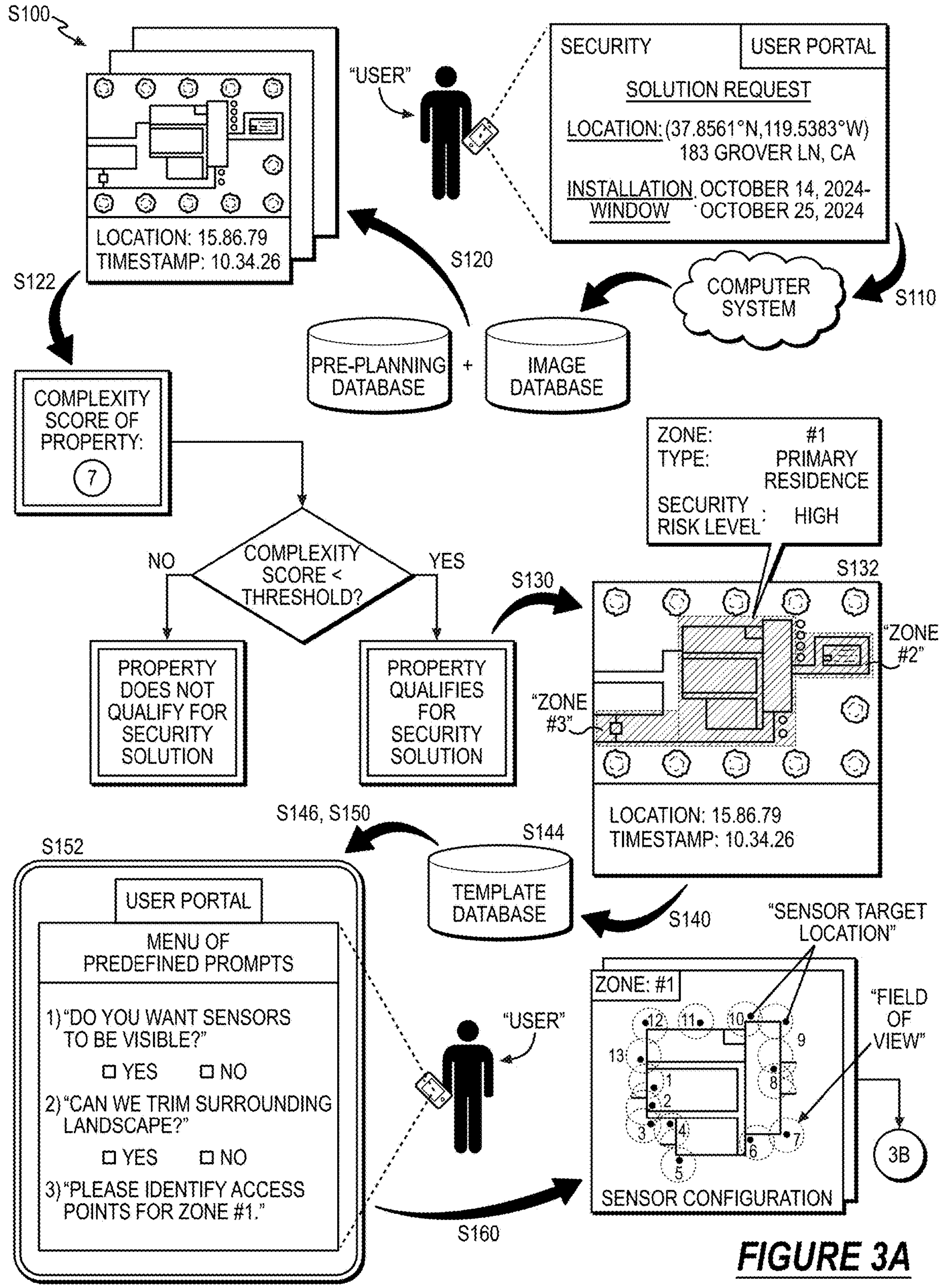
FIGS. 3A and 3B are flowchart representations of one variation of the method.

As shown in FIG. 3A, one variation of the method S100 for autonomously generating a security solution for a property includes: receiving a security solution request for the property specifying a location of the property from a user portal in Block S110; accessing an image depicting the property from an image database in Block S120; and detecting a set of features in the image.

This variation of the method S100 also includes, based on the set of features: defining a size of the property; characterizing a complexity score of the property based on size of the property in Block S122; and, in response to the complexity score falling below a threshold complexity score, representing the property as qualified in the user portal and defining a set of zones on the property in Block S130.

This variation of the method S100 further includes, for each zone in the set of zones: identifying a type, in a set of types, of the zone (e.g., a house, a gate, a driveway, a pool house, a garage, a fence, a yard, a guest house) in Block S132; accessing a baseline set of sensor configuration parameters associated with the type of the zone in Block S140; retrieving a template menu of user preference prompts associated with the zone in Block S144; presenting the template menu of user preference prompts within the user portal in Block S150; receiving selection of a set of user preferences for a security solution in the zone in Block S152; and iteratively generating a sensor configuration fulfilling the baseline set of sensor configuration parameters and the set of user preferences for the zone in Block S160.

1.3. Variation: Dynamic Security Score+User Preference Weighting

Figure 3B:
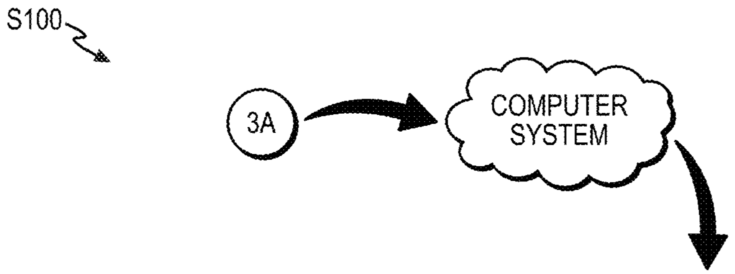
Figure 3B:
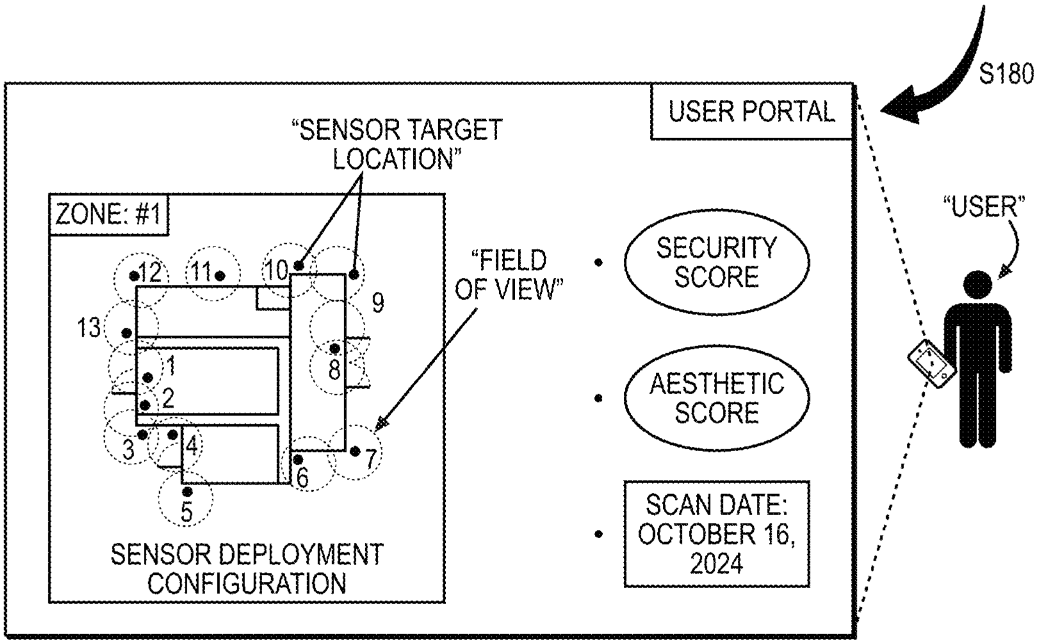

As shown in FIG. 3B, the method S100 further includes for each zone in the set of zones: generating an interface depicting a set of sliders, each slider in the set of sliders representing a weight assigned to a user preference in the set of user preferences of the zone; in response to accessing positions of the set of sliders, assigning a set of weights to the set of user preferences of the zone based on the positions of the set of sliders; calculating a security score as a weighted combination of the set of weights and the baseline set of sensor configuration parameters of the sensor configuration associated with the zone in Block S170; associating the security score with the sensor configuration for the zone; and presenting a set of sensor configurations and a set of security scores, associated with the set of zones, to the user within the user portal in Block S180.

1.4. Variation: Sparse Image Data+Dispatch of Aerial Vehicle

One variation of the method S100 includes: receiving a security solution request for the property specifying a location of the property from a user portal in Block S110; accessing an image depicting the property from an image database in Block S120; detecting absence of a segment of the property in a region of the image; and, in response to detecting absence of the segment of the property in the image, dispatching an aerial vehicle to execute a scan of the property in Block S190.

The method S100 further includes, accessing a set of images captured by the aerial vehicle; aggregating the set of images into a representation of the property; and defining a set of zones on the property based on features detected in the representation in Block S130.

The method S100 also includes, for each zone in the set of zones: identifying a type, in a set of types, of the zone (e.g., a house, a gate, a driveway, a pool house, a garage, a fence, a yard, a guest house) in Block S132; accessing a baseline set of sensor configuration parameters associated with the type of the zone in Block S140; retrieving a template menu of user preference prompts associated with the zone in Block S144; presenting the template menu of user preference prompts within the user portal in Block S150; receiving selection of a set of user preferences for a security solution in the zone in Block S152; iteratively generating a sensor configuration fulfilling the baseline set of sensor configuration parameters and the set of user preferences for the zone in Block S160; and presenting sensor configurations for the set of zones to the user within the user portal in Block S180.

2. Applications

Generally, a computer system (e.g., a remote computer server) can execute Blocks of the method S100 to receive a security solution request specifying a location of a property (e.g., a building, a home, a residence), such as entered by a user (e.g., a customer, a client, a manager) via a user portal and to automatically develop a security solution for quantity, types, and positions of sensors installed across an exterior of a building on the property in order: to achieve comprehensive coverage of the exterior (e.g., regions-of-interest falling within combined fields of view of sensors); to achieve a minimum overlap between fields of view of the sensors; and to accommodate preferences of the user once the sensors are installed.

In particular, the computer system can execute Blocks of the method S100: to receive a security solution request specifying a location of a property, such as entered by a user via the user portal; to access optical data, topographical data, property records data, and/or crime data associated with the location of the property; to receive selection of a set of user preferences (e.g., sensor visibility, exposed wire visibility, landscape modifications, exterior modifications) for the security solution; to iteratively generate a possible sensor configuration for the exterior of the property fulfilling a set of baseline sensor configuration parameters and/or sensor coverage parameters (e.g., a quantity of sensors, an offset distance between adjacent sensors, a linear position tolerance range, an angular position tolerance range, a minimum overlap between fields of view of adjacent sensors); to calculate a security solution metric or score—such as a quantitative score (e.g., "9/10" or "90%) or a qualitative score (e.g., "high security," "medium security," or "low security") of the possible sensor configuration as a weighted combination of sensor redundancy, sensor coverage, and the set of user preferences; and to present the possible sensor configuration and the security score, via the user portal, to the user for feedback.

Furthermore, the computer system can access a stored image depicting the property from an image database (e.g., a satellite or aerial image database). The computer system can then implement computer vision techniques: to define zones (e.g., regions-of-interest) for the property; to autonomously predict a type of each zone, such as a residence zone type, a fence zone type, a yard zone type, a gate zone type, etc. ; and to assign a predefined security risk level (e.g., high, medium, low) to each zone based on the type of the zone. Alternatively, the computer system can present the stored image to the user via the user portal. The user may manually define zones, security risk levels, and access points (e.g., exterior doors, windows, garage doors, pet doors, gates) within each zone on the stored image within the user portal.

Additionally, the computer system can access a template profile database and select a template security profile for a high security risk level zone in the template profile database. The template security profile specifies a predefined menu of user preference prompts (e.g., a survey) such as including: a size of the property; visibility of sensors; modifications to surrounding landscape (e.g., permissible to trim surrounding landscape, impermissible to trim surrounding landscape); modifications to the exterior of the property (e.g., holes in exterior walls to install sensors); and/or minimize exposed wires between adjacent sensors, etc. The computer system can present the predefined menu of user preference prompts within the user portal and receive a set of user preferences selected by the user. The computer system can further verify the property as qualified or disqualified for a security solution prior to generating possible sensor configurations for the property. The computer system interprets a complexity score of the property (e.g., a size of the property or a quantity of zones defined in the stored image) and verifies the property as qualified or disqualified according to the complexity score.

Accordingly, the computer system iteratively generates a possible sensor configuration fulfilling a set of baseline sensor distribution and/or coverage parameters and a predefined minimum quantity of user preferences for the high security risk level zone and serves the possible sensor configuration to the user.

Alternatively, the computer system can identify a stored image as sparse (e.g., empty regions or absence of segments of the property in the stored image) and dispatch an operator with an aerial vehicle or automatically dispatch the aerial vehicle to execute a scan of the exterior of the property. The computer system can access high-resolution images captured by the aerial vehicle and execute Blocks of the method S100 to iteratively generate a possible sensor configuration for the exterior of the property fulfilling a set of baseline sensor configuration parameters, preferences of the user, and/or sensor coverage parameters.

Therefore, the computer system can execute Blocks of the method S100 to autonomously derive possible sensor configurations for zones on a property that achieve comprehensive sensor coverage of the zones, achieve a minimum overlap between fields of view of adjacent sensors, and accommodate the user's preferences. Additionally, by autonomously deriving possible sensor configurations, the computer system: streamlines setup; reduces installation time duration; and improves the user's experience who may exhibit limited knowledge of characteristics of the property when requesting a security solution.

2.1. Security Solution Comparison+Tradeoffs

Furthermore, the computer system can present a set of viable sensor configurations to the user. For example, the computer system can: generate a first sensor configuration that fulfills a particular installation preference specifying no modifications of exterior features (e.g., landscaping, a fence) located on the property; and calculate a first security score (e.g., 85%) for the first sensor configuration.

The computer system can then: generate a second sensor configuration that deviates from this installation preference by requiring modification of an exterior feature located on the property; and calculate a second security score (e.g., 95%) for the second sensor configuration. In response to the second security score exceeding the first security score, the computer system can present the first and second sensor configurations, annotated with corresponding security scores and/or proposed deviations from installation preferences, to the user.

Thus, the computer system can present a higher-scoring alternative solution to the user, thereby representing or quantifying the tradeoff between the installation preference and security performance of the security system. Accordingly, the computer system can present multiple viable sensor configurations, including options that deviate from user preferences, and support an informed user decision based on the quantified tradeoffs.

3. System

Generally, the system includes: a computer system; a population of sensors; and a communication network. The computer system is configured to communicatively couple to the population of sensors and the communication network (e.g., wireless communication network, the Internet, wired communication network, LAN).

The population of sensors can include: optical sensors (e.g., RGB color cameras, LIDAR sensors, depth sensors); thermal sensors (e.g., thermal cameras, IR sensors); and/or motion sensors (e.g., radar sensors, ultrasonic sensors). In one variation, the population of sensors includes a set of color cameras, each color camera defining a field of view, configured to transmit a set of color images to the computer system.

3.1. Computer System

In one implementation, the computer system (e.g., a remote computer system, a remote server, a remote computer network) can receive a security solution request for a building (e.g., a property, a home, a residence) from a user (e.g., a customer, a client) via a user portal and generate a sensor configuration for the building corresponding to this security solution request.

In one variation, the computer system can: receive a security solution request for a building from a user via a user portal; access pre-planning data for the building (e.g., satellite images of the building, access points for the building, terrain conditions) associated with an address specified in the security solution request; receive selection of a set of preferences from the user via the user portal; verify that the building meets a baseline condition for a security system installation based on the pre-planning data and the set of preferences; generate a set of sensor configurations for the building that accommodates the set of preferences, achieves sensor redundancy, and achieves a minimum overlap between fields of view of these sensors; generate a set of scores representing weighted combinations of sensor coverage, sensor redundancy, and the set of user preferences, each score—in the set of scores—representing one weighted combination of sensor coverage, sensor redundancy, and the set of user preferences of one sensor configuration in the set of sensor configurations; associate the set of scores with the set of sensor configurations; and present the set of sensor configurations and the set of scores to the user within the user portal.

Accordingly, the computer system can: receive selection of a sensor configuration from the user portal; dispatch an operator and an aerial vehicle to the location of the property, specified in the security solution request, to scan the exterior of the property; and verify the sensor configuration selected by the user based on optical data (e.g., high-resolution images) captured by the aerial vehicle.

3.2. User Portal

The computer system can further interface with a user portal to assist users with security solution requests, planning, and installation for a property. The computer system can display various interfaces within the user portal to a user via a user's computing device (e.g., a smartphone, a tablet, a laptop computer) including: input interfaces for specifying a security solution request for a property and parameters associated with the property or otherwise configuring the security system order; and prompt interfaces that prompt the user to select a set of preferences, identify particular zones (e.g., regions-of-interest) on a map of the property, and/or assign a risk level to each zone for generation of a sensor configuration for the property.

4. Setup Period

Generally, as shown in FIG. 3A, during a setup period, a computer system can receive a security solution request for a particular property—such as a parcel of land including a building, a residence, or a home—from a user (e.g., a customer, a client) via the user portal. The computer system can then interface with the user portal to receive the security solution request for the particular property and access pre-planning data such as optical data, topographical data, building records data, and/or crime data of the property.

In one implementation, the computer system can access an image depicting the property from an image database (e.g., aerial or satellite image database) and implement computer vision techniques: to define a set of zones (e.g., regions-of-interest) in the stored image; to detect a zone type of each zone in the stored image; and to predict a security risk level (e.g., high risk, medium risk, low risk) of each zone. The computer system can accordingly rank or order the set of security zones based on the security risk levels and prompt the user to define access points (or "entry points")—such as exterior doors, windows, pet doors, or garage doors—for the highest-ranking zones in the stored image.

Furthermore, the computer system can: retrieve a set of template profiles (e.g., user surveys) associated with estimated zones of the property in the image; serve these user surveys to the user via the user portal; receive selection of a set of preferences for the security solution for this property; verify that the property qualifies for a security solution installation; iteratively generate a possible sensor configuration for the exterior of the property fulfilling a predefined minimum quantity of user preferences, a predefined minimum distance error between adjacent sensors (e.g., sensor redundancy), and a predefined minimum coverage error by a population of sensors (e.g., sensor coverage); calculate a security solution metric or score—such as a quantitative score (e.g., "9/10" or "90%) or a qualitative score (e.g., "high security," "medium security," or "low security") of the possible sensor configuration as a weighted combination of sensor redundancy, sensor coverage, and the set of user preferences; and present the predicted sensor configuration and the security score, via the user portal, to the user for feedback.

4.1. Order Request

Block S110 of the method S100 recites receiving a security solution request for the property, specifying a location of the property, from a user portal.

In one implementation, in Block S110, the computer system can receive a security solution request for a property from a user via the user portal. The user may define: a geospatial boundary (e.g., an address), a set of user data representing contact information associated with the user, a set of building characteristics, and an installation window prior to submitting the security solution request.

For example, the user may interface with the user portal to generate a security solution request specifying: a street number, a street name, and a city as the location of a building, such as a home of the user; a set of user data such as contact information for the user; a time window (e.g., duration) for installation of the security system for the home; and/or a set of building characteristics such as a size of the land occupied by the home (e.g., square footage), a size of the home (e.g., a quantity of floors or stories) and a quantity of entry points (e.g., doors, windows, garage doors, gates). The computer system can receive the security solution request from the user portal and execute Blocks of the method S100 to generate a sensor configuration for the exterior of the home.

Thus, a user may interface with a user portal to submit a security solution request for a particular building specifying a geospatial boundary, user data, an installation window, and/or building characteristics.

4.2. Pre-Planning Data Retrieval

Block S120 of the method S100 recites accessing a representation of a property, the representation depicting a building (e.g., a home) and exterior features (e.g., foliage, fencing) located on the property. Generally, in Block S120, the computer system can receive the security solution request from the user portal and automatically access pre-planning data associated with the property specified in the security solution order request. In particular, the computer system can access a set of pre-planning data from databases including: an image database; a topographical database; a building records database; and a crime database.

In one implementation, the computer system: accesses a stored image depicting the property from an image database (e.g., an aerial or satellite image database); detects a set of edge features, representing an outline of the land occupied by the property, in the stored image; detects a set of topographical features, representing a surrounding landscape of the property, in the stored image; and estimates zones (e.g., region-of-interest) within the stored image based on the set of edge features and the set of topographical features, as further described below. Alternatively, the computer system can: access an elevation profile of the property, representing an angle of the property relative to a ground surface, from a topographical database associated with the location of the property; and estimate zones within the stored image based on the set of edge features and the elevation profile of the property.

In one variation, the computer system: accesses building plans, permits, and elevation drawings from a building records database associated with the location of the property; accesses set of crime data for a geographic region (e.g., county) associated with the location of the property from a crime database; updates the estimated zones within the stored image according to these building records data to further refine the perimeters of the estimated zones; and autonomously predicts a set of security risk levels (e.g., high risk, medium risk, low risk) for the estimated zones according to crime statistics specified in the set of crime data for the geographic region.

Therefore, the computer system can automatically access a set of databases to select stored images, topographical data, building records data, and crime data associated with the location of the property defined in the security solution request. The computer system can then estimate a set of zones within a stored image depicting the property and predict a set of security risk levels (e.g., high risk, medium risk, low risk) for the set of zones.

5. Autonomous Zone Estimation+Security Risk Level Prediction

Blocks of the method S100 recite: identifying a set of zones located on the property based on the representation of the property in Block S130; and identifying a type, in a set of types, of the zone (e.g., a house, a gate, a driveway, a pool house, a garage, a fence, a yard, a guest house) in Block S132. Generally, the computer system can: access a stored image depicting the building from an image database (e.g., a satellite or aerial image database). The computer system can then implement computer vision techniques: to define zones (e.g., regions-of-interest) in the stored image; and to detect a type of each zone, such as a residence zone type, a fence zone type, a yard zone type, a gate zone type, etc. Furthermore, in one variation, the computer system can autonomously predict a security risk level (e.g., high, medium, low) for each zone.

In one implementation, the computer system: retrieves the stored image depicting the property from the image database; detects a set of edge features, representing an outline of land occupied by the property, in the stored image; and interprets a perimeter of the property based on the set of edge features. For example, the computer system can: retrieve a low-resolution stored image depicting the property from a satellite image database; and apply image processing techniques—such as filtering, gradient calculation, thresholding, and edge detection—to detect discontinuities in brightness in the stored image that correspond to the set of edge features. Based on the set of edge features, the computer system can: interpret a perimeter of the land occupied by the property; and detect a pixel count of an area of the stored image bound by the perimeter. The computer system can calculate a surface area of the land occupied by the property based on the pixel count.

In one variation, the computer system implements methods and techniques described above: to detect a set of edge features representing, an outline of a primary home, in the stored image; and apply image processing techniques to identify discontinuities in brightness in the stored image to define zones, bound by the perimeter, in regions of the stored image. For example, the computer system can detect a set of edge features, representing an outline of a primary residence (e.g., home), in a region of the stored image and based on the set of edge features: interpret a perimeter of the primary residence; identify the perimeter of the primary residence as a zone; and detect a residence zone type of the zone. The computer system can then: retrieve a set of crime data for a geographic region (e.g., county) associated with the location of the property from a crime database; predict a security risk for the zone based on the set of crime data; and annotate the stored image with the zone, the residence zone type, and the security risk. The computer system can repeat the methods and techniques described above for each other region of the stored image to define a set of zones and a set of risk levels for the set of zones in the stored image.

Therefore, the computer system can: autonomously interpret a perimeter of land occupied by a property; estimate a set of zones, bound by the perimeter, within the stored image; and predict a security risk level of each zone corresponding to the zone type. By autonomously estimating zones and security risk levels, the computer system can forgo user input and thereby: reduce the setup time duration; improve user experience; and quickly generate a security solution for the security solution request.

5.1. Manual Zone Estimation+Security Risk Level Prediction

Block S154 of the method S100 recites accessing a surveillance zone of the property defined by the user for surveillance by the security system. In one implementation, the computer system: presents the stored image of the property to the user within the user portal; and prompts the user to define a boundary and/or a set of boundaries for a region-of-interest in the stored image and a corresponding security risk level (e.g., a perceived security risk level of the user). The user interfaces with the stored image to manually define a boundary on the stored image and enters this boundary at the user portal. The computer system then converts the boundary and/or the set of boundaries into a surveillance zone (e.g., with an associated security risk level for the property).

Alternatively, the computer system can: present the stored image of the property to the user within the user portal; and prompt the user to manually define a set of zones and a corresponding set of security risk levels—such as an anticipated security risk level (e.g., high, medium, low) and/or usage region of the property (e.g., high, medium, or low region-of-interest)—in the stored image of the property.

6. Template Profiles+Selection of User Preferences

In one variation, Blocks of the method S100 recite: identifying a set of zones located on the property based on the representation of the property, each zone in the set of zones characterized by a zone type (e.g., a house, a gate, a driveway, a fence) in Block S130; for each zone in the set of zones, accessing a set of preference prompts corresponding to the zone type of the zone in Block S144; aggregating preference prompts for each zone in the set of zones into an electronic survey in Block S146; serving the electronic survey to a user (e.g., a property owner) via user portal in Block S150; and accessing an installation preference defined by the user for installation of a security system on the property in Block S152.

Generally, the computer system can: maintain a template profile database of predefined user preference surveys associated with various zone types; retrieve a template menu of user preference prompts associated with the zone type of a first zone; present the template menu of user preference prompts within the user portal; and receive selection of a set of user preferences for a security solution in the first zone.

In one implementation, the computer system: accesses the template profile database of predefined user preference surveys associated with various zone types; identifies a zone annotated with a high security risk level within the stored image; selects a template profile storing a predefined menu of user preference prompts associated with the zone type of the zone; serves the predefined menu of user preference prompts to the user via the user portal; and receives a set of user preferences for a security solution in this zone from the user portal. Further, the predefined menu of user preference prompts can include: a size of the building; visibility of sensors; modifications to surrounding landscape (e.g., permissible to trim surrounding landscape, impermissible to trim surrounding landscape); modifications to the exterior of the building (e.g., holes in exterior walls to install sensors); or minimize exposed wires between adjacent sensors, etc.

For example, the computer system can display a menu of pre-defined use preference prompts associated with the highest-ranking zone including: a first prompt, such as "Do you want to see the population of sensors"; a second prompt, such as "Can there be exposed wires between adjacent sensors?"; a third prompt, such as "Can we trim surrounding landscape on the property?"; and a fourth prompt, such as "Can we drill holes into exterior walls to install the population of sensors?". The user may then review the menu of predefined user preference prompts and provide a set of feedback (e.g., "YES" or "NO") for the security solution.

Additionally, the computer system can further prompt the user to define a set of access points (or "entry points") (e.g., exterior doors, windows, gates, pet doors) for each zone in the stored image of the property. For example, the user may interface with the user portal to manually define a set of entry points, such as a front door, a back door, a side door, a garage door, and ten windows, for a primary residence zone within the stored image.

Therefore, the computer system can present a predefined menu of user preference prompts within the user portal for an estimated zone and receive feedback from the user specifying a set of user preferences for a security solution in this estimated zone.

6.1. Verification of Property for Security Solution Installation

In one variation, Blocks of the method S100 recite: characterizing a complexity score of the property based on size of the property in Block S122; and, in response to the complexity score falling below a threshold complexity score, representing the property as qualified in the user portal and defining a set of zones on the property in Block S130. Generally, in Block S122, the computer system can verify that the property, defined in the security solution request, qualifies for a security solution installation based on pre-planning data, features in the stored image, and the set of user preferences.

In one implementation, the computer system can: access a target complexity score representing a size of a qualified property and/or or a quantity of zones for the qualified property; characterize a complexity score of the property, defined in the security solution request, based on features in the stored image and/or the surface area of the land occupied by the property; and verify the property as qualified or disqualified according to the complexity score.

In one variation, in response to the complexity score falling below the threshold complexity score, the computer system: identifies the property as qualified; generates a notification indicating the property as qualified for a security solution installation; and displays the notification in the user portal. The computer system can then execute Blocks of the method S100 to generate possible sensor configuration for estimated zones of the property. Alternatively, in response to the complexity score exceeding the threshold complexity score, the computer system can: identify the property as disqualified; generate a notification indicating the property as disqualified for a security solution installation; and display the notification in the user portal.

7. Security Solution: Sensor Configuration

Blocks of the method S100 recite: generating a first sensor configuration for a set of sensors of the security system, the first sensor configuration fulfilling an installation preference, encompassing a surveillance zone, and characterized by a first set of sensor positions in Block S160; simulating a first field of view of the first sensor configuration based on the representation of the property and properties (e.g., extrinsic properties) of the set of sensors in Block S164; and calculating a first security score for the first sensor configuration based on the first field of view of the first sensor configuration in Block S170.

Generally, the computer system generates a set of sensor configurations (e.g., sensor map solution) for each zone in the stored image that accommodates the set of preferences, encompasses (e.g., partially encompasses, fully encompasses) the surveillance zone, achieves sensor redundancy, and achieves a minimum overlap between fields of view of these sensors. In particular, the computer system can generate a sensor configuration that exhibits a predefined minimum overlap between adjacent sensors deployed along the exterior of the building and a predefined minimum coverage for each zone. The computer system then calculates a security score (e.g., a surveillance coverage score) for each viable sensor configuration. In particular, the security score can be based on: a coverage ratio of the surveillance zone representing a fraction of the zone visible within the aggregate fields of view of the sensors; presence of regions of the surveillance zone blocked from view by the building or exterior features; and/or a degree of redundant overlap between adjacent fields of view.

In one implementation, as shown in FIG. 1, the computer system iteratively generates sensor configurations by simulating fields of view of each sensor configuration and perturbing sensor positions to target parameters (e.g., maximum property coverage, adherence to user preferences, a minimum overlap between fields of view). In particular, in this implementation, the computer system generates a first sensor configuration for a set of sensors of the security system that: fulfills one or more installation preferences specified by the user; captures a surveillance zone defined by the user; and is characterized by a first set of sensor positions. The computer system then: simulates a first field of view of the first sensor configuration based on the representation of the property and properties of the set of sensors (e.g., mount location and height; azimuth, elevation); and calculates a first security score for the first sensor configuration based on the first field of view of the first sensor configuration. In particular, the computer system calculates the security score proportional to a coverage ratio of the first surveillance zone.

The computer system then iteratively generates additional sensor configurations to maximize the security score. In particular, the computer system perturbs the first set of sensor positions of the first sensor configuration to generate a second set of sensor positions. The computer system then generates a second sensor configuration for the set of sensors, the second sensor configuration: fulfilling the first installation preference; encompassing the first surveillance zone; and characterized by the second set of sensor positions. The computer system then: simulates a second field of view of the second sensor configuration; and calculates a second security score for the second sensor configuration based on the second field of view of the second sensor configuration. In response to the second security score exceeding the first security score, the computer system implements methods and techniques described above to serve the second sensor configuration to the user via a user portal. Thus, the computer system can iteratively generate a sensor configuration, subject to installation constraints defined by the user, that maximizes the security score.

7.1. Template Sensor Configurations

In one variation, Blocks of the method S100 recite: identifying a set of zones located on the property based on the representation of the property, each zone in the set of zones characterized by a zone type (e.g., a house, a gate, a driveway, a fence) in Block S130; for a zone in the set of zones, accessing a baseline set of sensor configuration parameters associated with the type of the zone in Block S140; and iteratively generating a sensor configuration fulfilling the baseline set of sensor configuration parameters and a set of user preferences for the zone in Block S160.

In one variation, the computer system: implements methods and techniques described above to identify a set of zones located on the property based on the representation of the property, each zone in the set of zones characterized by a zone type; and, for each zone in the set of zones, accesses a template sensor configuration corresponding to the zone type of the zone and representing nominal sensor placement within the zone. The computer system can then derive a set of sensor positions for installing the set of sensors on the property based on template sensor configurations for the set of zones.

In this variation, the computer system: accesses a template sensor configuration associated with a particular zone type of a zone on the property from a template configuration database; extracts a set of sensor configuration parameters from the template sensor configuration; and solves a solution function for a sensor configuration (e.g., a set of target locations for a population of sensors) that fulfills the set of sensor configuration parameters.

In particular, the template sensor configuration can define a baseline set of sensor configuration parameters including: a quantity of sensors within a threshold distance of an access point; a quantity of sensors associated with an exterior corner of a building; a quantity of sensors associated with an interior corner of a building; an offset distance between adjacent sensors for each building type (e.g., twelve feet between adjacent sensors for a first story building, sixteen feet between adjacent sensors for a second story building, twenty feet between adjacent sensors for a third story building); a linear position tolerance range for a total quantity of sensors (e.g., (e.g., ±1 yard, ±2 feet); an angular position tolerance range for the total quantity of sensors (e.g., (e.g., ±3 degrees, ±2 degrees); and/or a minimum overlap between fields of view of adjacent sensors (e.g., 50%, 60%), etc.

In one variation, the computer system: accesses a template sensor configuration for a zone in the stored image from the template configuration database; calculates a baseline sensor configuration (e.g., a set of target locations for a population of sensors) for the exterior of a building occupying the zone according to the template sensor configuration; and iterates on possible solutions until a sensor configuration fulfills a linear position tolerance range for the population of sensors (e.g., (e.g., ±1 yard, ±2 feet), an angular position tolerance range for the population of sensors (e.g., (e.g., ±3 degrees, ±2 degrees), and/or a minimum overlap between fields of view of adjacent sensors (e.g., 50%, 60%).

For example, the computer system can: identify a size of a primary residence and a set of access points, such as a two-story home with four doors and ten windows, specified by the security solution request uploaded by the user via the user portal; and access a template sensor configuration associated with a two-story home with four doors and ten windows from the template configuration database. The computer system can extract a set of sensor configuration parameters specified in the template sensor configuration including: a quantity of sensors within a threshold distance of a door, such as one optical sensor within one foot of a door; a quantity of sensors, such as two sensors, associated with an exterior corner of the two-story home; a quantity of sensors, such as one sensor, associated with an interior corner of the two-story home; a baseline offset distance, such as sixteen feet for the two-story home, between adjacent sensors defined in the template sensor configuration; and a linear position tolerance range for a total quantity of sensors (e.g., ±1 yard, ±2 feet). The computer system can then iterate on possible solutions until a sensor configuration fulfills the set of sensor configuration parameters.

Therefore, the computer system can iteratively generate a security solution for each zone that achieves a minimum overlap between adjacent sensors and a predefined minimum coverage for a building occupying the zone once installed onto the exterior of the building. Additionally, the computer system calculates a set of target locations for the population of sensors, specified in the sensor configuration, within a linear position tolerance range and/or an angular position tolerance range to minimize human error during installation and power consumption by the population of sensors.

7.2. Accommodation of User Preferences

In one variation, the computer system further iterates on possible solutions until a sensor configuration exhibits the predefined minimum distance error, the predefined minimum coverage error by the population of sensors, and a predefined minimum quantity of user preferences (e.g., one user preference, two user preferences).

For example, the computer system can: retrieve a set of user preferences—such as a first preference for permissible sensor visibility, a second preference for impermissible modification of the landscape surrounding a home, and a third preference for sensor redundancy proximal a side door of the home—assigned to a particular zone in the stored image; and iterate on possible solutions for this particular zone until a sensor configuration fulfills the set of sensor configuration parameters and the predefined minimum quantity of user preferences.

In another variation, as shown in FIGS. 1 and 2, the computer system can: access an installation preference that governs sensor placement, property modifications, or sensor visibility; and translate this installation preference into viable positions on the property for installing the set of sensors. For example, the computer system can: access an installation preference specifying exclusion of free-standing sensor mounts to install the set of sensors on the property; identify a set of sensor positions for installing the set of sensors on a building and exterior features located on the property based on the representation of the property; and generate a sensor configuration specifying installation of the set of sensors arranged at the set of sensor positions.

In another example, the computer system can: access an installation preference specifying authorization for free-standing sensor mounts to install the set of sensors on the property; identify a set of sensor positions for installing the set of sensors on a set of free-standing sensor mounts on the property based on the representation of the property; and generate a sensor configuration specifying installation of the set of sensors on the set of free-standing sensor mounts and arranged at the set of sensor positions.

In another example, the computer system can: access an installation preference specifying no modifications to exterior features located on the property during installation of the security system; define a set of occlusion zones on the property, each occlusion zone in the set of occlusion zones blocked from view of a surveillance zone (e.g., defined by the user) by exterior features located on the property; identify a set of sensor positions, outside of the set of occlusion zones, for installing the set of sensors; and generate a sensor configuration specifying installation of a set of sensors at the set of sensor positions. Therefore, the computer system can generate a sensor configuration for installation of a population of sensors across an exterior of a building in a particular zone in order: to achieve complete coverage of the exterior; to achieve a minimum overlap between fields of view of adjacent sensors; and/or to accommodate user preferences once the population of sensors is installed.

7.3. Security Solution Metrics+User Preference Weighting

In one implementation, the computer system can generate a security solution metric—such as a quantitative metric or score (e.g., "9/10" or "90%") or a qualitative metric or score (e.g., "high security", "medium security," or "low security)—representing weighted combinations of sensor coverage, sensor redundancy, and/or the set of user preferences for a sensor configuration. The computer system can generate an interface within the user portal depicting controls to define a set of weights assigned to the set of user preferences, each weight representing an importance of the user preference in the set of user preferences and applied linearly (or exponentially) to the security solution metric.

In one variation, as shown in FIG. 3B, the computer system: generates an interface depicting a set of sliders, each slider—in the set of sliders—representing a weight assigned to a user preference in the set of user preferences. In response to accessing positions of the set of sliders, the computer system: assigns a set of weights to the set of user preferences based on the positions of the set of sliders; calculates a security score as a weighted combination of the set of weights and the set of sensor configuration parameters; associates the security score with the sensor configuration for the particular zone; and presents the sensor configuration and the security score to the user within the user portal.

For example, in response to detecting a first slider - representing a sensor visibility user preference—exhibiting an upper-most position indicating highest importance, the computer system can assign a first weight, in a set of weights, of 1.5 to the sensor visibility user preference. Additionally, in response to detecting a second slider—representing a landscape modification user preference - exhibiting a lower-most position indicating lowest importance, the computer system assigns a second weight, in the set of weights, of 0.1 to the landscape modification user preference.

In another variation, the computer system calculates a quantitative aesthetic metric or score (e.g., "9/10" or "90%"), a qualitative aesthetic metric or score (e.g., "high aesthetic," "medium aesthetic," or "low aesthetic") as a weighted combination of sensor coverage, sensor redundancy, and the set of user preferences for a sensor configuration generated for a particular zone. The computer system can then implement methods and techniques described above to: calculate the aesthetic score as a weighted combination of the set of weights and the set of sensor configuration parameters; associate the aesthetic score with the sensor configuration for the particular zone; and present the sensor configuration and the aesthetic score to the user within the user portal.

Therefore, by rendering an interface depicting controls for defining the set of weights assigned to the set of user preferences, the computer system can enable a user to customize a possible sensor solution in real-time (or approximating real-time) to generate a particular sensor configuration with a security metric or score best-suited to the user based on the user's preferences.

8. Sensor Configuration Presentation

Block S180 of the method S100 recites serving the sensor configuration to the user via a user portal. Generally, in Block S180, the computer system can serve a visual representation (e.g., an annotated map) of a particular sensor configuration to the user via the user portal. In one implementation, the computer system can: generate a visual representation including a representation of the property (e.g., an architectural plan) annotated with positions and sensor types of the set of sensors according to a particular sensor configuration; and serve the visual representation to the user via the user portal.

In another implementation, the computer system can serve a set of viable sensor configurations to the user. In this implementation, the computer system can implement methods and techniques described above: to access an installation preference that governs installation of the set of sensors (e.g., sensor placement, sensor visibility); to generate a first sensor configuration that fulfils the installation preference; and to calculate a security score for the first sensor configuration (e.g., exceeding a threshold security score). The computer system can then: generate a second sensor configuration that deviates from the first installation preference defined by the user; calculate a second security score for the second sensor configuration; and, in response to the second security score exceeding the first security score, serve the first sensor configuration and the second sensor configuration to the user via the user portal. In particular, the computer system can: annotate the first sensor configuration with the first security score; annotate the second sensor configuration with the second security score and the deviation from the installation preference; and serve the annotated sensor configurations to the user.

In one example, the computer system: accesses an installation preference specifying no modifications of exterior features located on the property during installation of the security system; generates a first sensor configuration fulfilling the installation preference; and calculates a first security score (e.g., 90%) for the first sensor configuration. The computer system then: generates a second sensor configuration for the set of sensors, the second sensor configuration requiring modification of an exterior feature located on the property; and calculates a second security score (e.g., 95%) for the second sensor configuration. In response to the second security score exceeding the first security score, the computer system serves the first sensor configuration, annotated with the first security score, and the second sensor configuration, annotated with the second security score and a proposed modification of the exterior feature, to the user via the user portal.

Thus, in this example, the computer system presents the second sensor configuration as a higher-scoring alternative, annotated with the proposed modification and the security-score improvement. By presenting this alternative sensor configuration to the user, the computer system can represent or quantify the tradeoff between the installation preference and security performance of the security system. Accordingly, the computer system can present multiple viable sensor configurations, including options that deviate from user preferences, and support an informed user decision based on the quantified tradeoffs.

9. User Revisions

In one variation, the computer system can: receive feedback (e.g., an additional installation preference, rejection of a sensor position) from the user on a particular sensor configuration; and generate a new sensor configuration accordingly.

In one example, the computer system implements methods and techniques described above to: generate a first sensor configuration that fulfils a first installation preference and includes a sensor installed on a surface of the building, the surface characterized by a surface type; calculate a first security score (e.g., 85%) for the first sensor configuration; and serve the first sensor configuration to the user. The computer system then: receives a second installation preference from the user via the user portal, the second installation preference specifying exclusion of sensors installed on surfaces characterized by the surface type; and, in response to the first sensor configuration including the sensor installed on the surface characterized by the surface type, generates a second sensor configuration for the set of sensors, the second sensor configuration excluding sensors installed on surfaces characterized by the surface type.

The computer system then: calculates a second security score (e.g., 70%) for the second sensor configuration; and, in response to the second security score falling below the first security score, serves the first sensor configuration and the second sensor configuration to the user via the user portal. In particular, the computer system: annotates the first sensor configuration with the first security score and the sensor installed on the surface; annotates the second sensor configuration with the second security score; and serves the annotated first and second sensor configurations to the user. Thus, in this example, the computer system quantifies the tradeoff between the user-imposed installation restriction and performance of the security system to support informed user decision-making.

10. User Confirmation+Installation Adjustments

In one variation, the computer system can: receive confirmation of a sensor configuration from the user via the user portal; and queue installation of the set of sensors at the property according to the set of sensor positions defined in the sensor configuration.

Upon installation of the set of sensors, the computer system can: access a set of real images captured by the set of sensors installed on the property according to the sensor configuration; derive a real field of view of the set of sensors based on the set of real images; and access a simulated field of view of the set of sensors (i.e., simulated in the sensor configuration). In response to the real field of view deviating from the simulated field of view, the computer system can: generate a prompt to adjust sensor positions of the set of sensors installed on the property according to the sensor configuration; and serve the prompt to an operator (e.g., an installer) via the user portal. The computer system can thus verify correctness of installation of the set of sensors according to the sensor configuration.

11. Scanning+Representation of Property

In one variation, Block S190 of the method S100 recites dispatching an aerial vehicle to execute a scan of the property. In one variation, the computer system: accesses a stored image from the image database; detects absence of a segment of the property in the stored image; and flags the security solution request for scanning. The computer system then: dispatches an operator to scan the property with an aerial vehicle (e.g., a drone) to collect high-resolution images of the property; aggregates these images captured by the aerial vehicle into a model of the property; projects a baseline security solution onto the model of the property; and executes Blocks of the method S100 to iteratively generate a sensor configuration that fulfills the linear position tolerance, the angular position tolerance, and the minimum predefined overlap between fields of view of adjacent sensors for the property.

In one variation, the computer system: accesses a low-resolution stored image from an aerial image database; detects absence of a segment of the property in a region of the stored image; flags the security solution request for scanning; and dispatches an operator with an aerial vehicle to the location of the property, specified in the security solution request, to execute a scan of the exterior of the property. The computer system then: receives a set of high-resolution images from the aerial vehicle; aggregates these high-resolution images into a three-dimensional representation of the exterior of the property; projects a baseline sensor configuration onto the three-dimensional representation of the exterior of the property; and executes Blocks of the method S100 to generate a sensor configuration that fulfills the baseline sensor configuration parameters associate with the baseline sensor configuration.

Thus, the computer system can identify a stored image as sparse (e.g., empty regions, or absence of segments of the property) and then dispatch an operator with an aerial vehicle to collect high-resolution images of the exterior of the property. Accordingly, the computer system derives a three-dimensional representation of the property based on these high-resolution images and then implements methods and techniques described above to generate a sensor configuration based on features detected in the three-dimensional representation.

Alternatively, as shown in FIG. 2, the computer system can: automatically dispatch the aerial vehicle to the location of a property to execute a scan; access a set of high-resolution color images depicting the exterior of the property from the aerial vehicle; stitch these images into a composite (e.g., panoramic) color image of the exterior of the property; project the sensor configuration previously generated for the property onto the composite color image; and execute Blocks of the method S100 to re-iterate on possible sensor configurations based on features detected in the three-dimensional representation of the property. The computer system can then dispatch the operator to the location of the property for installation of the sensor configuration. Thus, the computer system can derive a three-dimensional representation of the property and project the sensor configuration onto the representation in order to further refine the sensor configuration prior to installation onto the exterior of the property.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

accessing a representation of a property, the representation depicting a building and exterior features located on the property;

accessing a first installation preference defined by a user for installing a security system on the property;

accessing a definition of a surveillance zone of the property for surveillance by the security system;

detecting a set of zones located on the property based on the representation of the property;

for each zone in the set of zones:

characterizing a zone type of the zone; and accessing a template sensor configuration corresponding to the zone type of the zone and representing:

a quantity of sensors;

a set of nominal sensor positions;

a set of nominal sensor orientations; and a set of sensor types;

deriving a first set of sensor positions for installing a set of sensors of the security system on the property based on template sensor configurations for the set of zones;

generating a first sensor configuration for the set of sensors, the first sensor configuration:

fulfilling the first installation preference;

encompassing the surveillance zone; and characterized by the first set of sensor positions;

simulating a first field of view of the first sensor configuration based on:

the representation of the property; and properties of the set of sensors;

calculating a first security score for the first sensor configuration based on the first field of view of the first sensor configuration;

perturbing the first set of sensor positions of the first sensor configuration to generate a second set of sensor positions;

generating a second sensor configuration for the set of sensors, the second sensor configuration:

fulfilling the first installation preference;

encompassing the surveillance zone; and characterized by the second set of sensor positions;

simulating a second field of view of the second sensor configuration based on:

the representation of the property; and properties of the set of sensors;

calculating a second security score for the second sensor configuration based on the second field of view of the second sensor configuration; and in response to the second security score exceeding the first security score, serving the second sensor configuration to the user via a user portal.

2. The method of claim 1:

wherein accessing the first installation preference defined by the user comprises:

accessing the first installation preference specifying exclusion of free-standing sensor mounts to install the set of sensors on the property;

wherein deriving the first set of sensor positions for installing the set of sensors further comprises:

deriving the first set of sensor positions for installing the set of sensors on the building and exterior features located on the property based on the representation of the property; and wherein generating the first sensor configuration for the set of sensors comprises:

generating the first sensor configuration specifying installation of the set of sensors at the first set of sensor positions.

3. The method of claim 1:

wherein accessing the first installation preference defined by the user comprises:

accessing the first installation preference specifying authorization for free-standing sensor mounts to install the set of sensors on the property;

wherein deriving the first set of sensor positions for installing the set of sensors further comprises:

deriving the first set of sensor positions for installing the set of sensors on a set of free-standing sensor mounts on the property based on the representation of the property; and wherein generating the first sensor configuration for the set of sensors comprises:

generating the first sensor configuration specifying installation of the set of sensors on the set of free-standing sensor mounts and arranged at the first set of sensor positions.

4. The method of claim 1:

wherein accessing the first installation preference defined by the user comprises:

accessing the first installation preference specifying no modifications to exterior features located on the property during installation of the security system;

wherein deriving the first set of sensor positions for installing the set of sensors further comprises:

defining a set of occlusion zones on the property, each occlusion zone in the set of occlusion zones blocked from view of the surveillance zone by exterior features located on the property, based on the representation of the property; and deriving the first set of sensor positions, outside of the set of occlusion zones, for installing the set of sensors; and wherein generating the first sensor configuration for the set of sensors comprises:

generating the first sensor configuration specifying installation of the set of sensors at the first set of sensor positions.

5. The method of claim 1:

wherein accessing the first installation preference defined by the user comprises:

accessing the first installation preference specifying absence of modifications of exterior features located on the property during installation of the security system;

wherein serving the second sensor configuration to the user via the user portal comprises:

serving the second sensor configuration, annotated with the second security score and absence of modifications to exterior features located on the property, to the user via the user portal; and further comprising:

generating a third sensor configuration for the set of sensors, the third sensor configuration specifying a proposed modification to an exterior feature located on the property;

calculating a third security score for the third sensor configuration based on a third field of view of the third sensor configuration; and in response to the third security score exceeding the second security score:

serving the third sensor configuration, annotated with the third security score and specifying the proposed modification to the exterior feature, to the user via the user portal.

6. The method of claim 1:

further comprising:

for each zone in the set of zones:

accessing a predefined preference prompt corresponding to the zone type of the zone;

aggregating a set of predefined preference prompts for the set of zones into an electronic survey; and serving the electronic survey to the user via the user portal; and wherein accessing the first installation preference comprises accessing the first installation preference comprising responses to the electronic survey supplied by the user via the user portal.

7. The method of claim 1:

further comprising:

dispatching an aerial vehicle to execute a scan of the property;

accessing a set of images captured by the aerial vehicle during the scan;

detecting the building and exterior features located on the property based on the set of images;

aggregating the set of images into the representation of the property;

rendering the representation of the property, annotated with the building and exterior features, to the user via the user portal;

generating a prompt to define a two-dimensional surveillance zone of the property in the representation of the property; and serving the prompt to the user via the user portal; and wherein accessing the definition of the surveillance zone of the property for surveillance by the security system comprises:

receiving selection of the two-dimensional surveillance zone of the property from the user, responsive to the prompt, via the user portal; and defining a three-dimensional surveillance zone of the property based on the two-dimensional surveillance zone and the representation of the property.

8. The method of claim 1, wherein serving the second sensor configuration to the user comprises:

generating a visual representation comprising the representation of the property annotated with positions and sensor types of the set of sensors according to the second sensor configuration; and serving the visual representation to the user via the user portal.

9. The method of claim 1:

wherein generating the second sensor configuration for the set of sensors comprises:

generating the second sensor configuration specifying installation of a sensor on a surface of the building, the surface characterized by a surface type; and further comprising:

receiving a second installation preference from the user via the user portal, the second installation preference specifying exclusion of sensors installed on surfaces characterized by the surface type;

in response to the second sensor configuration specifying installation of the sensor on the surface characterized by the surface type:

generating a third sensor configuration for the set of sensors, the third sensor configuration excluding sensors installed on surfaces characterized by the surface type;

calculating a third security score for the third sensor configuration based on a third field of view of the third sensor configuration; and in response to the third security score falling below the second security score:

serving the second sensor configuration, annotated with the second security score and the sensor installed on the surface, and the third sensor configuration, annotated with the third security score, to the user via the user portal.

10. The method of claim 1, further comprising:

receiving confirmation of the second sensor configuration from the user via the user portal;

accessing a set of real images captured by the set of sensors installed on the property according to the second sensor configuration;

deriving a real field of view of the set of sensors based on the set of real images; and in response to the real field of view deviating from the second field of view simulated for the second sensor configuration:

generating a prompt to adjust sensor positions of the set of sensors installed on the property according to the second sensor configuration; and serving the prompt to an operator via the user portal.

11. The method of claim 1:

wherein detecting the set of zones located on the property comprises detecting a first zone located on the property based on the representation of the property;

wherein characterizing a zone type of each zone in the set of zones comprises characterizing a first zone type of a first zone in the set of zones;

further comprising:

accessing a first predefined preference prompt corresponding to the first zone type of the first zone;

generating an electronic survey comprising the first predefined preference prompt; and serving the electronic survey to a user via a user portal; and wherein accessing the first installation preference defined by the user comprises accessing the first installation preference defined by the user responsive to the electronic survey.

12. A method comprising:

accessing a representation of a property, the representation depicting a building and exterior features located on the property;

detecting a set of zones located on the property based on the representation of the property;

for each zone in the set of zones:

characterizing a zone type of the zone; and accessing a predefined preference prompt corresponding to the zone type of the zone;

aggregating a set of predefined preference prompts for the set of zones into an electronic survey;

serving the electronic survey to a user via a user portal;

accessing an installation preference defined by the user for installing a security system on the property, the installation preference defined by the user responsive to the electronic survey;

accessing a definition of a surveillance zone of the property for surveillance by the security system;

generating a first sensor configuration for a set of sensors of the security system, the first sensor configuration:

fulfilling the installation preference;

encompassing the surveillance zone; and characterized by a first set of sensor positions;

simulating a first field of view of the first sensor configuration based on:

the representation of the property; and properties of the set of sensors;

calculating a first security score for the first sensor configuration based on the first field of view of the first sensor configuration;

perturbing the first set of sensor positions of the first sensor configuration to generate a second set of sensor positions;

generating a second sensor configuration for the set of sensors, the second sensor configuration:

fulfilling the installation preference;

encompassing the surveillance zone; and characterized by the second set of sensor positions;

simulating a second field of view of the second sensor configuration based on:

the representation of the property; and properties of the set of sensors;

calculating a second security score for the second sensor configuration based on the second field of view of the second sensor configuration; and in response to the second security score exceeding the first security score, serving the second sensor configuration to the user via a user portal.

13. The method of claim 12, wherein generating the first sensor configuration for the set of sensors comprises:
for each zone in the set of zones:
accessing a template sensor configuration:
corresponding to the zone type of the zone; and
representing:
a quantity of sensors;
a set of nominal sensor orientations; and
a set of sensor types; and
deriving the first set of sensor positions for installing the set of sensors on the property based on template sensor configurations for the set of zones.

14. The method of claim 12:
wherein serving the second sensor configuration to the user via the user portal comprises:
serving the second sensor configuration, annotated with the second security score, to the user via the user portal; and
further comprising:
generating a third sensor configuration for the set of sensors, the third sensor configuration deviating from the installation preference defined by the user;
calculating a third security score for the third sensor configuration based on a third field of view of the third sensor configuration; and
in response to the third security score exceeding the second security score:
serving the third sensor configuration, annotated with the third security score and a proposed deviation from the installation preference, to the user via the user portal.

15. The method of claim 12, wherein generating the first sensor configuration for the set of sensors comprises:
identifying the first set of sensor positions for installing the set of sensors on the property based on the representation of the property and the installation preference defined by the user; and
generating the first sensor configuration specifying installation of the set of sensors at the first set of sensor positions.

16. A method comprising:
dispatching an aerial vehicle to execute a scan of a property;
accessing a set of images captured by the aerial vehicle during the scan;
detecting a building and a set of exterior features located on the property based on the set of images;
aggregating the set of images into a representation of the property, the representation depicting the building and the set of exterior features located on the property;
rendering the representation of the property, annotated with the building and the set of exterior features, to a user via a user portal;
generating a prompt to define a two-dimensional surveillance zone of the property in the representation of the property;
serving the prompt to the user via the user portal;
receiving selection of the two-dimensional surveillance zone of the property from the user, responsive to the prompt, via the user portal;
defining a three-dimensional surveillance zone of the property based on the two- dimensional surveillance zone and the representation of the property;
accessing an installation preference defined by the user for installing a security system on the property;
generating a first sensor configuration for a set of sensors of the security system, the first sensor configuration:
fulfilling the installation preference;
encompassing the three-dimensional surveillance zone; and
characterized by a first set of sensor positions;
simulating a first field of view of the first sensor configuration based on:
the representation of the property; and
properties of the set of sensors;
calculating a first security score for the first sensor configuration based on the first field of view of the first sensor configuration;
perturbing the first set of sensor positions of the first sensor configuration to generate a second set of sensor positions;
generating a second sensor configuration for the set of sensors, the second sensor configuration:
fulfilling the installation preference;
encompassing the three-dimensional surveillance zone; and
characterized by the second set of sensor positions;
simulating a second field of view of the second sensor configuration based on:
the representation of the property; and
properties of the set of sensors;
calculating a second security score for the second sensor configuration based on the second field of view of the second sensor configuration; and
in response to the second security score exceeding the first security score, serving the second sensor configuration to the user via a user portal.

17. The method of claim 16:
further comprising:
detecting a zone located on the property based on the representation of the property;
characterizing a zone type of the zone based on a set of features depicted in the zone in the representation of the property;
accessing a preference prompt corresponding to the zone type of the zone; and
serving the preference prompt to the user via the user portal; and
wherein accessing the installation preference comprises accessing the installation preference defined by the user in the user portal responsive to the preference prompt.

18. A method comprising:
accessing a representation of a property, the representation depicting a building and exterior features located on the property;
accessing an installation preference defined by a user for installing a security system on the property, the installation preference specifying exclusion of sensors installed on surfaces of the building characterized by a surface type;
accessing a definition of a surveillance zone of the property for surveillance by the security system;
generating a first sensor configuration for a set of sensors of the security system, the first sensor configuration:
encompassing the surveillance zone;
characterized by a first set of sensor positions; and
specifying installation of a sensor on a surface of the building characterized by the surface type;
simulating a first field of view of the first sensor configuration based on:
the representation of the property; and
properties of the set of sensors;

calculating a first security score for the first sensor configuration based on the first field of view of the first sensor configuration;

in response to the first sensor configuration specifying installation of the sensor on the surface characterized by the surface type:

perturbing the first set of sensor positions of the first sensor configuration to generate a second set of sensor positions; and generating a second sensor configuration for the set of sensors, the second sensor configuration:

encompassing the surveillance zone;

characterized by the second set of sensor positions; and excluding sensors installed on surfaces characterized by the surface type;

simulating a second field of view of the second sensor configuration based on:

the representation of the property; and properties of the set of sensors;

calculating a second security score for the second sensor configuration based on the second field of view of the second sensor configuration; and in response to the second security score falling below the first security score, serving the first sensor configuration, annotated with the first security score and the sensor installed on the surface, and the second sensor configuration, annotated with the second security score, to the user via a user portal.

19. The method of claim 12:

wherein generating the first sensor configuration for the set of sensors comprises generating the first sensor configuration for the set of sensors, the first sensor configuration specifying:

the first set of sensor positions; and a first set of sensor orientations;

further comprising:

perturbing the first set of sensor orientations of the first sensor configuration to generate a second set of sensor orientations; and wherein generating the second sensor configuration for the set of sensors comprises generating the second sensor configuration for the set of sensors, the second sensor configuration specifying:

the second set of sensor positions; and the second set of sensor orientations.

* * * * *